May 27, 1924.

W. POTTER

PLANE

Filed June 13, 1922

1,495,796

Inventor
William Potter
By his Attorneys
Edgar Date & Co.

Patented May 27, 1924.

1,495,796

UNITED STATES PATENT OFFICE.

WILLIAM POTTER, OF NEW YORK, N. Y.

PLANE.

Application filed June 13, 1922. Serial No. 567,941.

*To all whom it may concern:*

Be it known that I, WILLIAM POTTER, a citizen of the United States, and residing at New York, in the county of New York and State of New York, have invented certain new and useful Improvements in Planes, of which the following is a specification, such as will enable those skilled in the art to which it appertains to make and use the same.

This invention relates to planes and particularly to wood cutting planes adapted for use in cutting grooves or depressions of various shapes and forms in a suitable workpiece, and the object of the invention is to provide a plane stock or body with which predetermined tools or cutter blades and predetermined guide members for said blades are adapted to be mounted; a further object being to provide means for detachably securing such cutter blades and guide members in connection with said stock or body; a further object being to provide means for detachably securing a handle member in connection with said stock or body; and a still further object being to provide means for adjustably and detachably securing a suitable guide member or square in connection with the stock or body; and a still further object being to provide an adjustable depth gage for the stock or body of the plane; and with these and other objects in view the invention consists in a plane of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of my improved plane with parts of the construction broken away and in section, and indicating one method of its use;

Fig. 2 a front edge view of the plane shown in Fig. 1;

Fig. 3 a partial section on the line 3—3 of Fig. 1;

Figures 1, 2, 3, 4, 5:
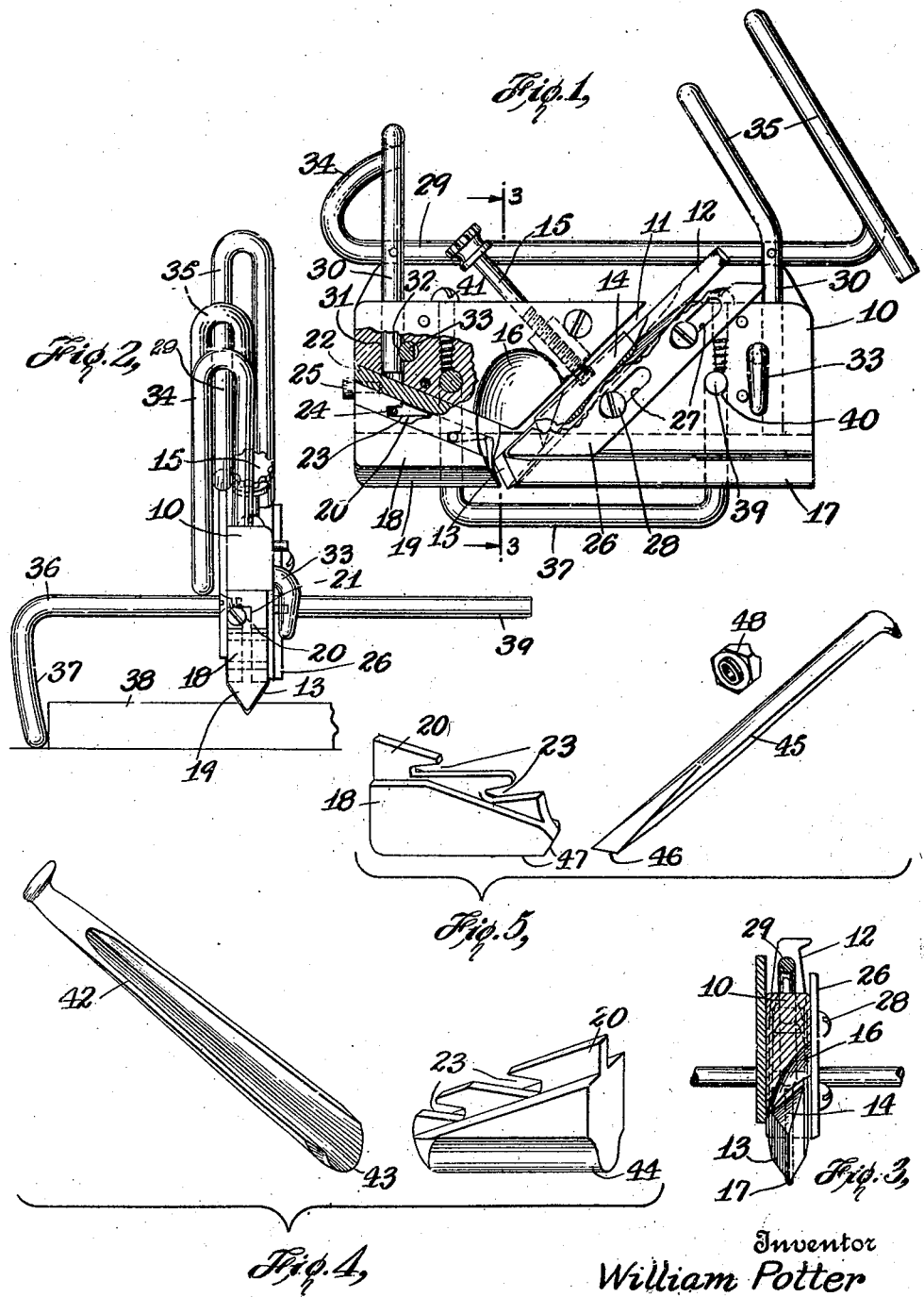
Fig. 4 shows perspective detail views of a modified form of cutter blade with the guide member employed in combination with said blade.
Fig. 5 shows detail views of another form of cutter blade and guide member therefor as well as a modified form of tool-lock or wedge member.

In Figs. 1, 2 and 3 of the drawing, I have shown at 10 the stock or body portion of my improved plane which is oblong and rectangular in form and comparatively narrow in transverse dimensions, and this stock or body may be composed of wood or metal, and is provided approximately centrally thereof with a downwardly and forwardly directed aperture 11 in which a tool and tool set are adapted to be mounted, and in Figs. 1 to 3 inclusive, I have shown a tool 12 mounted in the stock or body 10 or the aperture 11 thereof, and the cutting edge of said tool being substantially V-shaped in form as shown at 13, and a tool set or wedge block 14 is mounted in the groove of the tool 12 and is moved into operative and inoperative positions by a suitable set screw 15 which extends upwardly and forwardly through the body 10, as clearly shown in Fig. 1 of the drawing. At the lower end of the aperture 11 in the body 10, one side face of the body 10 is cut out to form a recess 16 into which the shavings are adapted to pass as will be apparent.

The bottom face of the stock or body 10 of the plane rearwardly of the aperture 11 and rearwardly of the cutting tool 12 mounted therein is provided with a depending supporting face 17, which is of comparatively narrow width as indicated in Fig. 3 of the drawing, and which is adapted to operate in the groove cut by the cutter 12 in the operation of the plane to hold the plane in proper position.

Detachably mounted in connection with the front lower corner portion of the stock or body 10 of the plane is a guide member 18, the lower face 19 of which, in the construction shown, is V-shaped in form in cross section and corresponds with the shape of the cutting edge 13 of the tool 12 and the member 18 is provided with a tongue member 20 adapted to enter a corresponding groove 21 in the stock or body of the plane 10, or in a reinforcing member 22 secured thereto, and the tongue member 20 is provided with two apertures 23, one of which is clearly shown in Fig. 1 of the drawing, adapted to cooperate with projecting members or pins 24 in the groove 20 to retain the member 18 against downward movement in the stock or body 10 of the plane and a set screw 25 is mounted in the stock or body 10 of the plane, or the reinforcing member 22 thereof, and serves to hold the member 18 against outward or forward movement in the stock or body 10.

On one side face of the stock or body 10 is adjustably secured a depth gage or guide member 26 comprising a plate provided with elongated apertures 27 through which screws 28 are passed by means of which the member 26 may be raised and lowered with reference to the bottom face of the part 17 of the plane, or the beveled face 19 of the member 18, and by adjusting the member 26 downwardly it will be understood that the depth of the cut of the plane will be limited.

I also provide a handle member 29 for the stock or body 10, said handle member in the construction shown being formed from rod-like material fashioned to form two downwardly directed shanks 30 adapted to extend into vertical apertures 31 in the stock or body 10 of the plane and provided adjacent to the lower ends of said shanks with recesses 32 in connection with which lock members 33 rotatably mounted in the stock or body 10 are adapted to operate for detachably retaining the handle members 29, or the shanks 30 thereof in connection with the stock or body 10. The front end portion of the handle member 29 is provided with an upstanding portion 34 and the rear end portion thereof is provided with two hand-pieces 35 by means of which the handle member 29 may be firmly grasped in one hand of the operator and the upstanding portion 34 of the handle member may be grasped by the other hand of the operator, if desired.

I also employ a guide or square member 36 for my improved plane comprising a yoke-shaped device, the cross head 37 of which extends downwardly and is adapted to operate in connection with one edge portion of a suitable workpiece 38, as shown in Fig. 2 of the drawing, and the shanks 39 of the member 36 are adapted to pass through transverse apertures 40 in the stock or body 10 of the plane and held in predetermined position of adjustment by set screws 41.

It will be understood that with a plane of the form and construction shown in Figs. 1 to 3 inclusive, and by reason of the formation of the cutting edge 13 of the cutter blade 12 as well as the formation of the parts 17 and 18 of the plane, I may cut in a suitable workpiece very fine grooves or shavings from the face of a workpiece, or may cut V-shaped or other grooves therein, and by changing the relative position of the cutter blade of the plane from time to time with reference to one edge of the workpiece, the width of the groove cut may be regulated. It will be understood that I am not necessarily limited to the use of the V-shaped cutter blade in connection with my improved plane, and in Fig. 4 of the drawing I have shown a substitute for the parts 12 and 18 employed in the construction shown in Figs. 1 to 3 inclusive, and substituted for the cutter blade 12 is a cutter blade 42; the cutting edge 43 of which is arc-shaped or semi-circular in form; and with this construction the part 18, or the lower face thereof; is arc-shaped in form as shown at 44 instead of being V-shaped in form as shown at 19 in Figs. 1 to 3 inclusive. Aside from this the part 18 is of the same general form and construction as the part 18 shown in Fig. 1 of the drawing.

In Fig. 5 of the drawing, I have shown another form of cutter blade 45, the cutting edge 46 of which is straight and of comparatively narrow width, and this body is used for the purpose of cutting a groove of predetermined width in a workpiece, and the part 18 will be provided with a flat face 47 in the use of the blade 45 instead of a V-shaped or semi-circular face as with the construction shown in Figs. 1 and 4, and with the construction shown in Fig. 5 of the drawing, I also substitute for the part 14 a nut-shaped member 48 which serves to retain the tool 45 in predetermined positions of adjustment.

It will be understood that I am not necessarily limited to the specific form and construction of the stock or body 10 of the plane herein shown and described, nor to the specific form of handle member, or the guide or square member employed, and various other changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A plane of the class described comprising an elongated comparatively narrow stock or body, said stock or body being fashioned to receive a cutter blade which is V-shaped in form in cross section, the bottom face of said stock or body being provided centrally and longitudinally thereof and rearwardly of a blade mounted therein with an elongated fin of substantially the same dimensions throughout its length and depth, the front lower corner portion of the stock or body being angularly cut away and provided with a channel, pins mounted transversely in the stock or body and extending through the channel therein, a guide member adapted to fill the cut-away portion of the stock or body and provided with a slotted fin portion adapted to enter the channel of the stock or body and the slots of which to receive and engage said pins and means for retaining said guide member in position.

2. A plane of the class described comprising an elongated, narrow and straight stock or body, a part of the bottom or bearing surface of said stock or body being reduced to form a narrow fin, and a cutter blade V-shaped in form in cross section and provided with a V-shaped cutting edge adapted to be mounted in the stock or body with the cutting edge thereof positioned forwardly of the fin of said stock or body, the cross section of said fin being narrower laterally above its bottom line than the corresponding plane of section of the V-shaped cutter.

3. A plane of the class described comprising an elongated and comparatively narrow stock or body, the front lower corner portion of said stock or body being cut-away on an inclination and provided with a longitudinal groove intersected by transverse pins, a guide member engaging said cutaway portion and having a rib portion engaging said groove and slotted to engage said intersecting pins and maintaining said guide member in place.

4. A grooving plane adapted for cutting grooves of various contours comprising a stock having a bit receiving seat, interchangeable bits, the cutting edges of which have different degrees of salience, interchangeable forward sole portions the cross sectional contours of which correspond with those of the several bits respectively and the sole portion of the stock to the rear of the bit seat being a deep and thin rib or fin, the plane of which is aligned with the point of greatest salients of the bit.

5. A grooving plane adapted for cutting grooves of various contours comprising a stock having a bit receiving seat, interchangeable bits, the cutting edges of which have different degrees of salience, interchangeable forward sole portions the cross sectional contours of which correspond with those of the several bits respectively and the sole portion of the stock to the rear of the bit seat being a deep and thin rib or fin, the plane of which is aligned with the point of greatest salience of the bit, and means for detachably mounting the sole portions in connection with the stock.

In testimony that I claim the foregoing as my invention I have signed my name this 10th day of June 1922.

WILLIAM POTTER.